Nov. 18, 1924.                                                           1,516,081
H. G. COYKENDALL
SAFETY DEVICE FOR MOTOR VEHICLES
Filed May 24, 1924
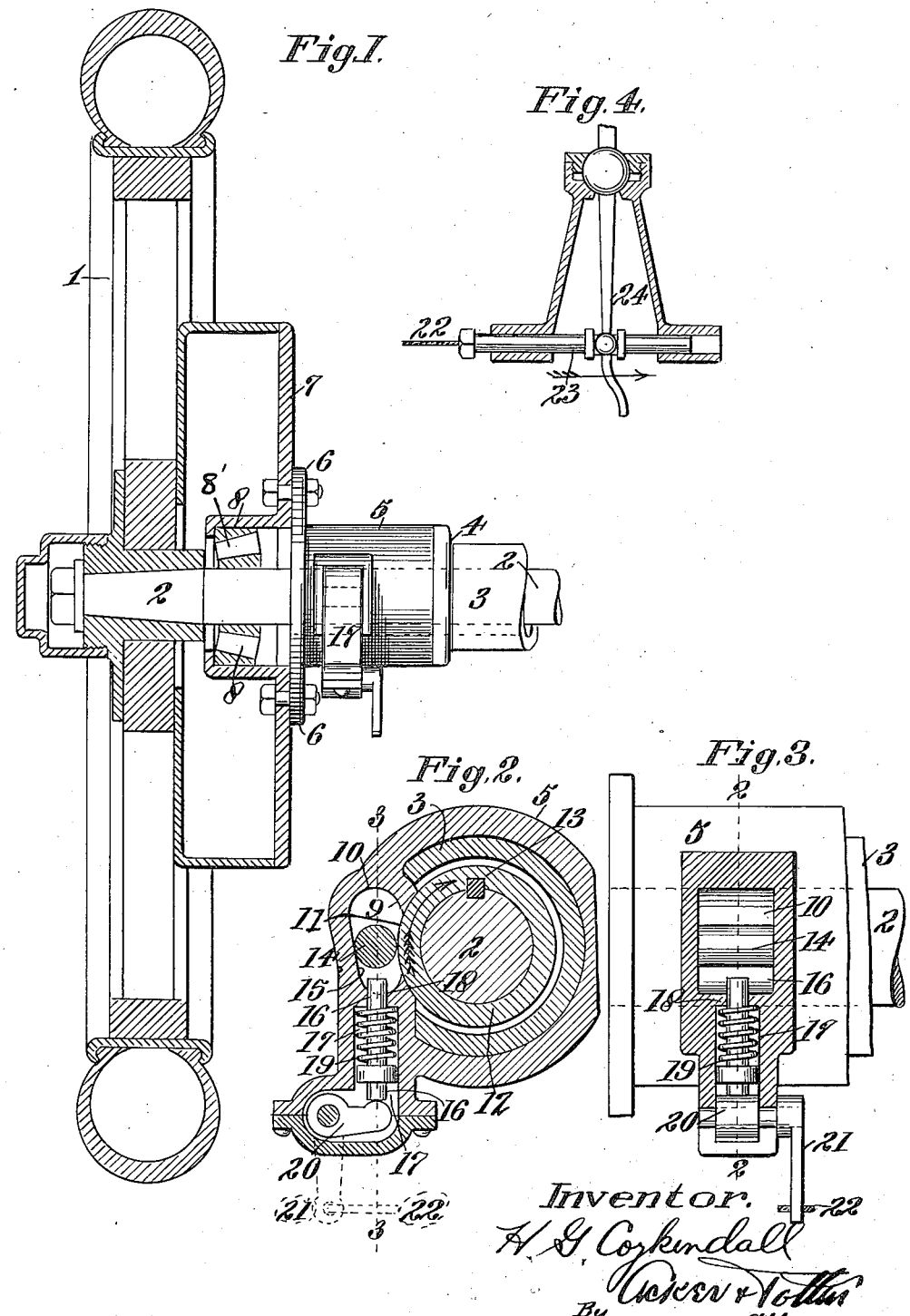
Inventor.
H. G. Coykendall
By Acker & Tottin
   Attorneys.

Patented Nov. 18, 1924.

1,516,081

UNITED STATES PATENT OFFICE.

HORATIO G. COYKENDALL, OF BERKELEY, CALIFORNIA.

SAFETY DEVICE FOR MOTOR VEHICLES.

Application filed May 24, 1924. Serial No. 715,590.

*To all whom it may concern:*

Be it known that I, HORATIO G. COYKENDALL, a citizen of the United States, residing at Berkeley, in the county of Alameda and State of California, have invented certain new and useful Improvements in Safety Devices for Motor Vehicles, of which the following is a specification.

Motor driven vehicles as at present constructed are not provided with means to prevent the backward running thereof when steep grades are encountered, and the brakes fail to hold, or during a gear change operation when going up a steep grade. Numerous accidents have taken place by a vehicle backing down grade over a bank or curve due to the failure of the brakes to hold in ascending a grade and encountering some difficulty which would require the throwing out of the clutch or the failure to make a proper change of gear.

This invention has for its object to overcome the rearward movement of a vehicle on a grade when the same is not intended, in fact locking the vehicle from rearward movement thereby relieving the strain on the brakes and enabling the vehicle operator to change gears while ascending a grade without fear of the vehicle travelling backward downwardly of the grade while the clutch is disengaged and the gear selection is being made.

The present invention relates to a construction wherein the rearward movement of the vehicle is permitted at such time as the gear shift mechanism is moved into what may be commonly termed the reverse position. A further object is to provide a construction capable of ready incorporation at an extremely small cost on the majority of motor vehicles now in use, and the release mechanism of which is connected with and controlled by a gear shift mechanism.

While I have illustrated in the present embodiment of the invention a structure associated with the rear axle and rear axle housing, it is to be understood that the locking mechanism may be employed in connection with any of the driven parts in the line of power transmission between the point of contact of the rear wheels with the ground and the change speed mechanism.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings, wherein—

Figure 1 is a sectional view partly in elevation, illustrating my safety device.

Figure 2 is a transverse sectional view on line 2—2 of Figure 3, illustrating the cam roller within its cam groove, the cam releasing plunger and the bell crank lever for operating the same.

Figure 3 is a sectional view on line 3—3 of Figure 2, illustrating the relative positioning of the parts for releasing the cam roller, and Figure 4 is a view of the connection between one member of the bell crank lever and the shift mechanism whereby the cam roller is elevated at such time as the shift lever is moved to reverse the driving parts.

In the drawings wherein like characters of reference designate corresponding parts, 1 indicates a vehicle wheel associated with an axle 2 which passes through the hub thereof. The axle rotates within a tubular axle housing 3 carrying an annular flange 4 which forms an abutment for the inner end of a sleeve 5. The sleeve is held on the housing in any suitable manner, and to the flanged outer end 6 thereof is secured a disk 7 between the hub 8 of which and the shaft 2 is positioned a thrust bearing 8' of any suitable type. To preclude the rotation of the sleeve about the axle housing 3 a portion of the axle housing is cut away to receive the inner projecting flange portions 9 carried by the sleeve 5. The sleeve is formed with a substantially vertically disposed cam chamber 10 between the flanges 9, one wall of which is broken as at 11 to admit the periphery of a wear ring 12 keyed as at 13 to the axle 2, as in Figure 2 of the drawings. Positioned within the cam groove 10 is a cam roller 14 of a sufficient diameter when the same drops to a point adjacent the base of the groove to contact with the rear wall 15 of the groove, and with the surface of the wear ring 12, thus precluding rotation of the axle 2 in a direction reverse to that illustrated by the arrow, Figure 2 of the drawings.

To enable the vehicle to back under its own power, or to freely roll rearwardly at such time as the reverse driving gears are in engagement, I provide a releasing member for the cam roller 14, which consists of a reciprocating plunger 16 mounted within a plunger chamber 17 in the sleeve 5, the upper end of the plunger being guided in its movement into the chamber 10 by the walls of the plunger guide opening 18. A spring 19 normally maintains the plunger in inoperative position, and to throw the plunger to disengage the cam roller from the wear ring 12, I provide a bell crank lever operating in the base of the plunger chamber. The member 20 of the lever coacts with the lower end of the plunger, and the member 21 of the lever which extends exteriorly of the chamber is connected by a suitable connection 22 with the member 23 of the gear shift mechanism, which is adapted to move forwardly on the shifting of the vehicle gears to arrange the same in interengaging reverse driving position. The member 23 is adapted to be operated by the conventional form of gear shift lever 24.

It will be observed that during such time as the vehicle travels in the forward direction, the cam roller 14 will be elevated in its cam groove by the action of the wear ring 12 thereon, but immediately on the rearward movement of the vehicle at such time when the reversing gears are not in reverse driving position, the action of the shift 22 in its reverse rotation causes a jamming or locking of the cam roller in its groove and which is only released on the forward movement of the vehicle or on the shifting of the driving gears to reverse driving position.

I claim:

1. In combination with a motor driven vehicle having a variable speed and direction controlling mechanism, a rotatably mounted driven member, a fixed part adjacent thereto provided with a cam groove intersected by the periphery of the shaft, a cam roller therein normally engaging the shaft for interrupting the rotation thereof in one direction, a reciprocating plunger movable into engagement with the cam roller to retain the same in inoperative position, a lever for operating the plunger, and a connection between the lever and variable speed and direction controlling mechanism whereby the cam roller is thrown into inoperative position on the movement of said variable speed and direction controlling mechanism into reverse position.

2. In combination with a motor driven vehicle having a variable speed and direction controlling mechanism, a rear axle housing, a rear axle rotatably mounted therein, said housing being formed with a vertically inclined cam recess intersecting the path of rotation of the axle, a cam roller therein normally engaging said axle to preclude its rotation in a reverse direction, a plunger chamber formed in said housing and communicating at its upper end with said cam groove through a plunger guide opening, a plunger reciprocably mounted within said chamber with its end projecting through the guide opening for engaging with the cam roller, a bell crank lever pivotally carried by said axle housing with one portion engaging the plunger, a connection between the other portion of the lever and the variable speed direction controlling mechanism, whereby the cam roller is thrown into inoperative position on the movement of said mechanism into reverse position.

In testimony whereof I have signed my name to this specification.

HORATIO G. COYKENDALL.